US010454750B2

(12) United States Patent
Mizuki et al.

(10) Patent No.: US 10,454,750 B2
(45) Date of Patent: Oct. 22, 2019

(54) INFORMATION-PROCESSING SYSTEM, INFORMATION-PROCESSING DEVICE, INFORMATION-PROCESSING METHOD, AND STORAGE MEDIUM FOR ACCESSING A SERVICE THAT SHARES INFORMATION (71) Applicant: NINTENDO CO., LTD., Kyoto (JP)

(72) Inventors: Kiyoshi Mizuki, Kyoto (JP); Hideto Yuzawa, Kyoto (JP); Shunsaku Kato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 57 days.

(21) Appl. No.: 13/771,651

(22) Filed: Feb. 20, 2013

(65) Prior Publication Data
US 2013/0325999 A1 Dec. 5, 2013

(30) Foreign Application Priority Data

May 31, 2012 (JP) ................. 2012-125103

(51) Int. Cl.
H04L 29/08 (2006.01)
G06Q 50/00 (2012.01)
(Continued)

(52) U.S. Cl.
CPC ........ H04L 29/08549 (2013.01); G06F 21/71 (2013.01); G06Q 10/10 (2013.01);
(Continued)

(58) Field of Classification Search
CPC ............... G06Q 50/01; G06Q 30/0633; G06Q 20/3674; H04L 67/306; H04L 51/32;
(Continued)

(56) References Cited

U.S. PATENT DOCUMENTS 6,755,743 B1 * 6/2004 Yamashita ............ A63F 13/005
463/40
2006/0256135 A1 11/2006 Aoyama et al.
(Continued)

FOREIGN PATENT DOCUMENTS

JP 2006-285535 10/2006
JP 2008-217048 9/2008
(Continued)

OTHER PUBLICATIONS

"Xbox Live Connects You", http://www.xbox.com/ja-JP/live/stayconnected (1 pg.), and English counterpart <http://www.xbox.com/en-US/live/stay-connected> (2 pgs.), printed Jan. 9, 2013.

Primary Examiner — Tauqir Hussain
(74) Attorney, Agent, or Firm — Nixon & Vanderhye, P.C.

(57) ABSTRACT

An exemplary information-processing system includes: a storage unit configured to store identification information of one or more other users; an execution unit configured to execute at least one of a plurality of programs including a first program for accessing an information sharing service and a second program that differs from the first program; a first registration unit configured to register, in the storage unit, identification information of another user, through execution of the first program by the execution unit; and a second registration unit configured to register, in the storage unit, identification information of another user, through execution of the second program by the execution unit.

19 Claims, 6 Drawing Sheets (51) Int. Cl.
*G06F 21/71* (2013.01)
*G06Q 10/10* (2012.01)

(52) U.S. Cl.
CPC ..... *G06Q 50/01* (2013.01); *G06F 2221/2109* (2013.01); *G06F 2221/2117* (2013.01)

(58) Field of Classification Search
CPC . H04L 12/588; H04L 63/0869; H04L 63/104; G06F 2221/2109; G06F 2221/2117; G06F 9/445; H04N 21/4788
See application file for complete search history.

(56) References Cited

U.S. PATENT DOCUMENTS

| | | | |
|---|---|---|---|
| 2008/0114834 A1 | 5/2008 | Miyazaki | |
| 2008/0299953 A1* | 12/2008 | Rao | G06Q 10/10 455/414.1 |
| 2009/0089806 A1* | 4/2009 | Mayer | G06F 9/542 719/318 |
| 2009/0111581 A1* | 4/2009 | Ostergren | A63F 13/12 463/42 |
| 2010/0287212 A1* | 11/2010 | Becker | G06F 8/00 707/803 |
| 2011/0029610 A1* | 2/2011 | Chao et al. | 709/204 |
| 2011/0078228 A1* | 3/2011 | Bristol | H04L 51/04 709/202 |
| 2011/0191406 A1* | 8/2011 | Plunkett et al. | 709/203 |
| 2011/0296506 A1* | 12/2011 | Caspi | 726/6 |
| 2011/0302052 A1* | 12/2011 | Giese | G06F 21/10 705/26.25 |
| 2011/0312398 A1* | 12/2011 | Ziegler | A63F 13/58 463/9 |
| 2011/0313827 A1* | 12/2011 | Lobb | G06Q 30/0207 705/14.12 |
| 2011/0314482 A1* | 12/2011 | Cupala | G06F 9/542 719/328 |
| 2011/0319148 A1* | 12/2011 | Kinnebrew | A63F 13/216 463/1 |
| 2012/0036189 A1* | 2/2012 | Sadamoto | G07F 17/32 709/204 |
| 2012/0143968 A1* | 6/2012 | Oren et al. | 709/206 |
| 2012/0150650 A1* | 6/2012 | Zahand | G06Q 30/0251 705/14.58 |
| 2012/0174156 A1* | 7/2012 | Park | H04N 5/44543 725/40 |
| 2012/0209839 A1* | 8/2012 | Andrews | G06Q 10/10 707/728 |
| 2012/0271957 A1* | 10/2012 | Carney et al. | 709/228 |
| 2012/0303652 A1* | 11/2012 | Tseng | G06Q 30/02 707/769 |

FOREIGN PATENT DOCUMENTS

| | | |
|---|---|---|
| JP | 2009-020583 | 1/2009 |
| JP | 2011-101775 | 5/2011 |
| JP | 2012-044427 | 3/2012 |

* cited by examiner

| SELF | OTHER | 515 |
|---|---|---|
| 00000001 | 00000002 | |
| | 01345678 | |
| | 01456789 | |
| | 01567890 | |
| 00000002 | 00000001 | |
| | 00879653 | |
| | 00987654 | |
| . . . | . . . | |

FIG. 4

| SELF | OTHER | 521 |
|---|---|---|
| 00000001 | NA | |
| 00000002 | 01345678 | |
| | 01456789 | |
| | 01567890 | |
| 00000003 | 00000001 | |
| | 00000002 | |

INFORMATION-PROCESSING SYSTEM, INFORMATION-PROCESSING DEVICE, INFORMATION-PROCESSING METHOD, AND STORAGE MEDIUM FOR ACCESSING A SERVICE THAT SHARES INFORMATION

CROSS-REFERENCE TO RELATED APPLICATIONS

This application is based on and claims priorities under 35 USC 119 from Japanese patent application No. 2012-125103, which was filed on May 31, 2012.

FIELD

The present disclosure relates to technology for accessing a service that shares information.

BACKGROUND AND SUMMARY

Information-processing devices that has a function to communicate with other users using a communication function are known.

In contrast, the present disclosure provides technology for uniformly managing identification information of other users that is used by two programs.

There is provided an information-processing system including: a storage unit configured to store identification information of one or more other users; an execution unit configured to execute at least one of plural programs including a first program for accessing an information sharing service and a second program that differs from the first program; a first registration unit configured to register, in the storage unit, identification information of another user, through execution of the first program by the execution unit; and a second registration unit configured to register, in the storage unit, identification information of another user, through execution of the second program by the execution unit.

BRIEF DESCRIPTION OF THE DRAWINGS

Exemplary embodiments will be described with reference to the following drawings, wherein.

DETAILED DESCRIPTION OF NON-LIMITING EXEMPLARY EMBODIMENTS

1. First Embodiment 1-1. Configuration

In the present embodiment, an information-processing device includes a first application (e.g., client program for accessing information sharing service), a second application (e.g., video game program), and system software (OS of information-processing device). By respectively executing the information sharing service and the system software, a user is able to establish an association with other users via a network. In the present embodiment, the information-processing device synchronizes associations on the information sharing service with associations on the system (actual information-processing device itself).

In the information sharing service, a user is able to establish an association with specific users. In this example, there are two types of associations in the information sharing service, namely "friend" and "favorite". "Friend" denotes a relationship between two users who have mutually consented to (authenticated) the establishment of an association. Users who become friends obtain each other's posts automatically. That is, friends preferentially obtain and display each other's information.

A "favorite" is another user specifically designated from among users who are not friends. For example, the processing in the information sharing service differs depending on whether the other user is a favorite or not, such as the (released) posts of other users who are registered in favorites being automatically obtained but the posts of other users who are not registered in favorites (and are also not friends) not being automatically obtained. For example, in the case where user A has registered user B as a favorite but has not registered user C as a favorite (neither user B nor user C are friends with user A), a client program of user A automatically obtains the posts of user B but does not automatically obtain the posts of user C. That is, the relationship with a user who is a favorite is such that a user who has registered that user as a favorite automatically obtains and displays information of that user, but a user who has not registered that user does not automatically obtain information of that user.

Note that the information sharing service is an example of a service that shares posting information. Posting information may be provided by so-called buzz marketing sites or blogs, for example.

A user is also able to establish an association with specific users in the actual information-processing device (system software) itself. In this example, associations in the information-processing device consist of one type, namely "friend". "Friend" denotes a relationship between two users who have mutually consented to (authenticated) the establishment of an association. Users who are friends can perform an interactive fighting game via the Internet or the like, when they execute a game application or the like. That is, when friends on the actual information-processing device execute various applications, they are able to communicate with each other according to those applications.

Figure 1:
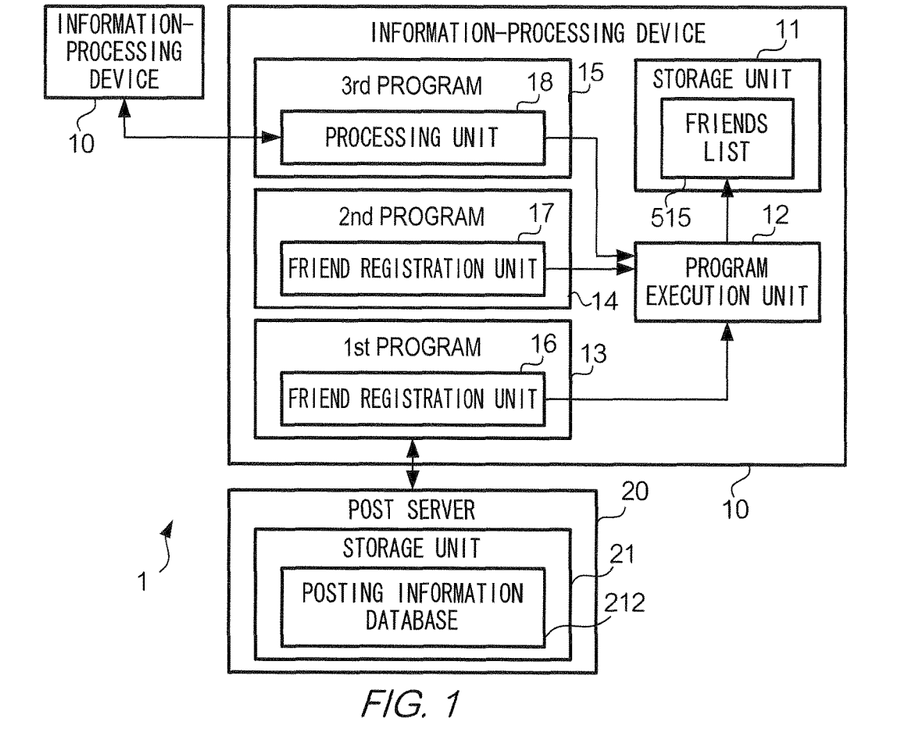
FIG. 1 shows an example of a functional configuration of information-processing system 1 according to one embodiment.

FIG. 1 shows a functional configuration of information-processing system 1 according to one embodiment. Information-processing system 1 includes plural information-processing devices 10 and posting server device 20. In order to simplify the diagram, only two information-processing devices 10 are illustrated here. Posting server device 20 is a server device for providing an information sharing service. In the information sharing service, posting information from each of the plurality of information-processing devices 10 is transmitted to posting server device 20. Posting server device 20 includes storage unit 21 that stores posting information database 212 for accumulating posting information. Posting server device 20, according to a request from a specific information-processing device 10, provides posting information accumulated in posting information database 212 to the information-processing device 10 from which the request originated. Posting information includes character strings (text), handwritten characters or images that serve as opinions, remarks, questions, comments and messages (hereinafter, referred to simply as a "message" if needed) input by users. That is, the users of information-processing devices 10 are able to view the messages of other users, release their own messages and exchange messages with other users, through this information sharing service.

Information-processing device 10 includes storage unit 11 and program execution unit 12. Storage unit 11 stores friends list 515. Friends list 515 includes identification information of one or more other users who are friends with the user of information-processing device 10. Program execution unit 12 executes at least one of plural programs including first program 13, second program 14, and third program 15. Program execution unit 12, when executing first program 13, functions as friend registration unit 16. Friend registration unit 16 registers identification information of other users in friends list 515. Program execution unit 12, when executing second program 14, functions as friend registration unit 17. Friend registration unit 17 registers identification information of other users in friends list 515. Program execution unit 12, when executing third program 15, functions as processing unit 18. Processing unit 18 executes communication processing (interactive fighting game, etc.) relating to third program 15 with another information-processing device 10. In this example, third program 15 is a program for receiving simultaneously (or in time-series) inputs (or data) from the user of information-processing device 10 and the user of another information-processing device 10, via a network, and performing processing according to the received inputs (or data).

Figure 2:
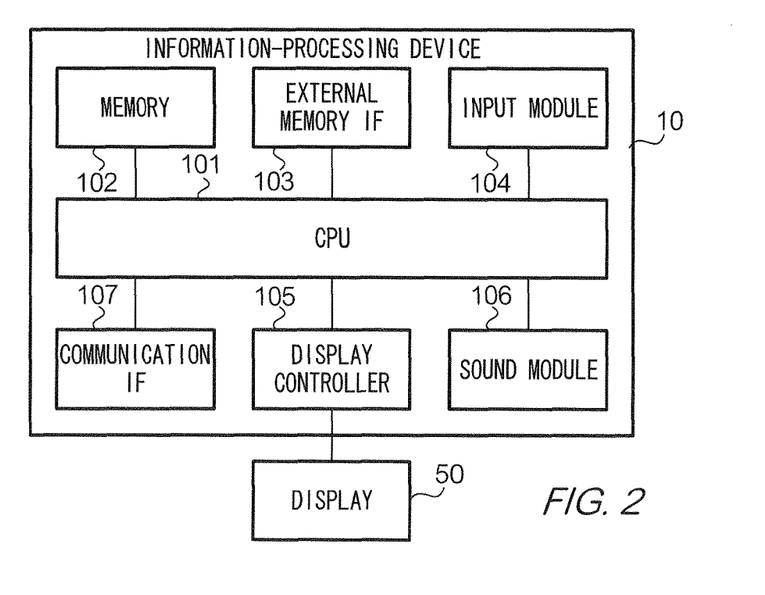
FIG. 2 shows an example of a hardware configuration of information-processing device 10.

FIG. 2 shows a hardware configuration of information-processing device 10. In this example, information-processing device 10 is a game device for executing a video game. Information-processing device 10 is a computer device that includes CPU (Central Processing Unit) 101, memory 102, external memory IF 103, input module 104, Display controller 105, sound module 106, and communication IF 107. Information-processing device 10 is connected to display device 50. Display device 50 is a device that displays information such as images and characters, and includes a display (liquid crystal panel, organic EL (Electro-Luminescence) panel, etc.) and a drive circuit. In this example, information-processing device 10 is a so-called console-type game device, and does not incorporate display device 50. Display device 50 is an external device, such as a television receiver, for example. Note that information-processing device 10 may incorporate display device 50.

CPU 101 is a device that controls the constituent elements of information-processing device 10, and performs various arithmetic operations. Memory 102 is a storage device that stores programs and data, and includes a RAM (Random Access Memory) and a ROM (Read Only Memory), for example. External memory IF 103 is an interface that performs writing and reading of programs and data to and from a storage medium (e.g., optical disk, magnetic disk, or semiconductor memory) that stores programs and data. Input module 104 is an input device that inputs instructions or commands from the user to CPU 101, and includes a keypad, buttons, a touch panel or a microphone, for example. Display controller 105 is a device that causes the display device to display information such as images and characters, and includes an image processing circuit and a video signal output circuit, for example. Sound module 106 is a device that outputs an audio signal, and includes an audio processing circuit and an audio signal output circuit, for example. Communication IF 107 is a device that performs communication via a wired or wireless network (e.g., Internet) in accordance with a predetermined communication standard.

Figure 3:
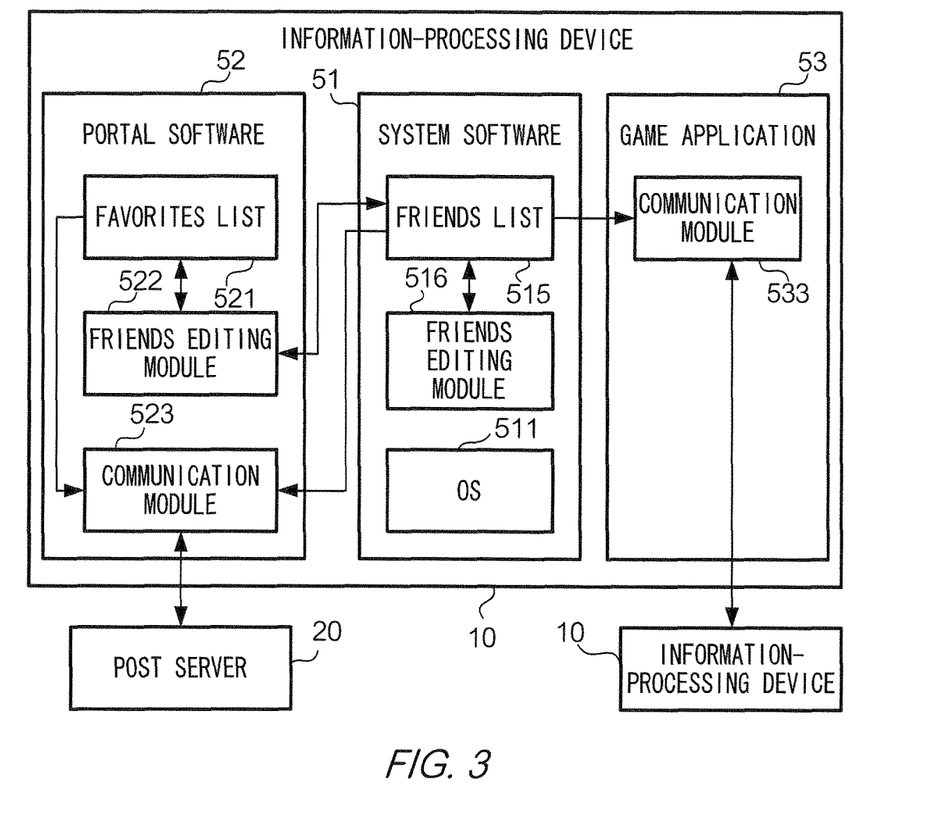
FIG. 3 shows an example of a software configuration of information-processing device 10.

FIG. 3 shows a software configuration of information-processing device 10. Information-processing device 10 includes system software 51, portal software 52, and game application 53.

System software 51 is software for managing or controlling information-processing device 10. System software 51 is essential software for executing various application programs in information-processing device 10, and is software that definitely exists in information-processing device 10 when an application program is executed. In this example, system software 51 includes OS (Operating System) 511. OS 511 is basic software for operating application programs such as portal software 52 and game application 53. Also, in this example, system software 51 includes friends list 515 and friends editing module 516. Friends editing module 516 edits friends list 515.

Figure 4:
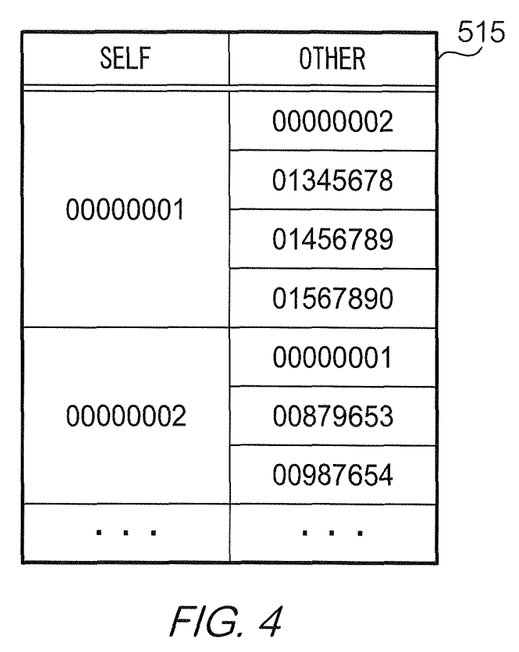
FIG. 4 illustrates an example of friends list 515.

FIG. 4 illustrates friends list 515. In this example, friends list 515 includes, for every user, a list of identification information of users who are friends. In friends list 515, "Self" shows identification information (e.g., user ID) of each user who uses information-processing device 10, and "Other" shows identification information of other users who are friends with the user. For example, in the example in FIG. 4, the user having user ID "00000001" is friends with four other users having user IDs "00000002", "01345678", "01456789" and "01567890".

Referring again to FIG. 3, portal software 52 is client software of the information sharing service, and provides an interface that presents information to users and receives input of information from users. In this example, portal software 52 includes favorites list 521, friends editing module 522, and communication module 523. Favorites list 521 includes identification information of one or more other users that users of information-processing device 10 have registered as favorites. Friends editing module 522 edits friends list 515 and favorites list 521. Communication module 523 realizes communication with other users via the information sharing service. Specifically, communication module 523 transmits a request to posting server device 20, and causes an image of the information sharing service to be displayed, in accordance with data that is transmitted from posting server device 20 according to the request. The image of the information sharing service includes one or more pieces of posting information of one or more users and a UI (User Interface) for inputting and transmitting posting information-processing performed in the information sharing service includes communication with users registered in friends list 515 and favorites list 521.

Thus, in this example, information-processing device 10 has two lists, namely friends list 515 and favorites list 521. Friends list 515 can be rewritten from system software 51 and portal software 52 to register the identification information of other users who will become friends or to delete the identification information of other users who are already registered. Favorites list 521 can be rewritten from portal software 52 to register or delete identification information.

Note that in the case where plural users share information-processing device 10, the user who is active is specified by so-called login processing.

Figure 5:
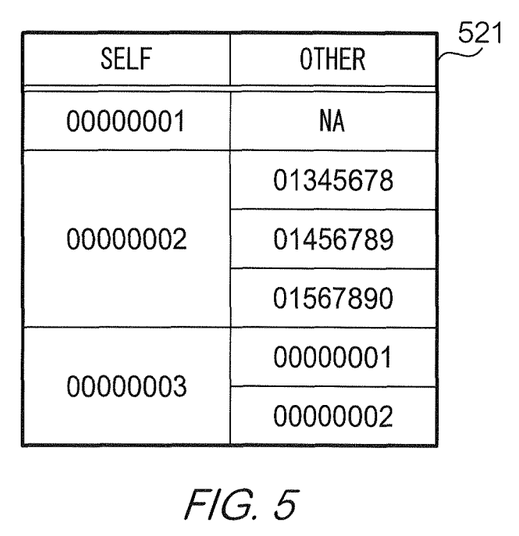
FIG. 5 illustrates an example of favorites list 521.

FIG. 5 illustrates favorites list 521. In this example, favorites list 521 includes, for every user, a list of identification information of other users who are registered as favorites. In favorites list 521, "Self" shows identification information of each user who uses the information-processing device, and "Other" shows identification information of other users who the user has registered as favorites. For example, in the example in FIG. 5, the user having user ID "00000002" is shown to have registered three other users having user IDs "01345678", "01456789" and "01567890" as favorites.

Referring again to FIG. 3, game application 53 is an application program (software) for causing information-processing device 10 to execute a video game. Information-processing device 10 is capable of executing various game applications 53. Programs for realizing game applications 53 are stored in a storage medium (external memory), for example, and the user executes a desired game application 53 on information-processing device 10, by causing information-processing device 10 to read the program stored in a desired storage medium from among plural storage media that respectively store different programs. In another example, plural programs are stored in memory 102, and the user executes a desired game application 53 on information-processing device 10 by executing a desired program from among the stored programs.

In this example, game application 53 includes communication module 533. Communication module 533 realizes communication with the users of other information-processing devices 10 registered in friends list 515. Communication in game application 53 includes processing for carrying out interactive fighting in a game and processing for exchanging items (virtual objects) via the Internet or the like, for example.

In the present embodiment, system software 51 and portal software 52 are prestored in memory 102 at the point of sale of the information-processing device. That is, system software 51 and portal software 52 are provided as functions of the platform of information-processing device 10. Note that portal software 52 may be provided by download via a network, rather being prestored at the point of sale of the information-processing device. Game application 53 is stored in an external memory. Note that game application 53 may be stored in memory 102.

Memory 102 and an external memory are examples of storage unit 11. Portal software 52 is an example of first program 13. System software 51 is an example of second program 14. Game application 53 is an example of third program 15. Friends editing module 522 is an example of friend registration unit 16. Friends editing module 516 is an example of friend registration unit 17. Communication module 533 is an example of processing unit 18.

1-2. Operations

Friends list 515 is shared by system software 51 and portal software 52. That is, access from both system software 51 and portal software 52 (i.e., reading out and rewriting, or in other words, registration, deletion, etc. of other users) is possible with respect to friends list 515. Also, access from game application 53 (i.e., reading out, or in other words, use in communication with other users) is possible with respect to friends list 515. Hereinafter, processing for rewriting friends list 515 from portal software 52 and processing for rewriting friends list 515 from system software 51 will be described in this order.

1-2-1. Case of Portal Software 52

Figure 6:
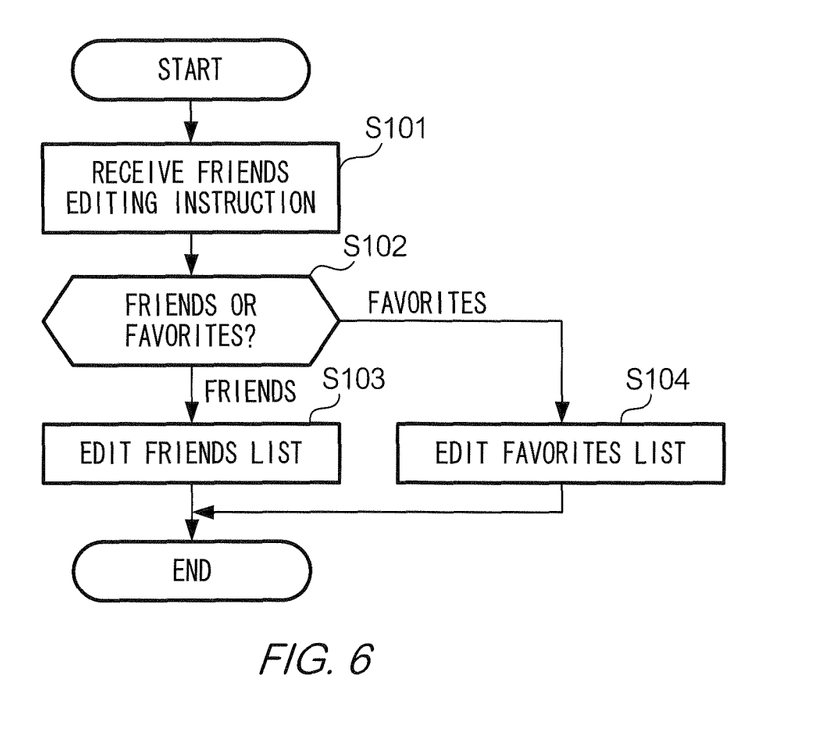
FIG. 6 shows an example of a flowchart illustrating a process for rewriting from portal software 52.

FIG. 6 is a flowchart showing processing for rewriting from portal software 52. Portal software 52 is activated at the start of the flow in FIG. 6. In information-processing device 10, portal software 52 and game application 53 are controlled by the function of OS 511 so that only one is active. That is, at the start of the flow in FIG. 6, game application 53 is either not activated or is suspended. Note that suspension denotes interrupting (temporarily stopping) execution of game application 53, with data used by game application 53 expanded in memory 102. Rewriting of friends list 515 by system software 51 can be avoided when portal software 52 is being executed. Also, although software such as portal software 52 and system software 51 will be described below as the agent of the processing, this means that CPU 101, when executing this software, performs the processing in cooperation with other hardware.

In step S101, portal software 52 receives an instruction to edit friends. Editing friends as referred to here encompasses both editing of friends list 515 and editing of favorites list 521. That is, this editing instruction is one of adding a new friend, deleting an existing friend, adding a new favorite or deleting an existing favorite. This editing instruction is input via a friends list editing image of portal software 52, for example. Alternatively, a button for processing a friend application is displayed on the profile image of the other user in the case where that user is not a friend, and a button for processing a friend cancellation is displayed on the profile image of the other user in the case where that user is a friend, and an editing instruction is input by pressing this button. This editing instruction includes identification information of the user (self), identification information of the other user, information indicating the type of association (friend or favorite), and information indicating the type of editing (addition or deletion).

Note that an interface for inputting an editing instruction may be provided on the image for displaying posting information. In this case, portal software 52 displays posting information along with attribute information (username, etc.) of the user who posted the posting information. A button for inputting an editing instruction for a friend application and a favorite addition, for example, is provided on the image on which the posting information is displayed.

In step S102, portal software 52 determines whether the editing instruction is an instruction to edit friends list 515 or an instruction to edit favorites list 521. If it is determined to be an instruction to edit friends list 515 (S102: friends), portal software 52 shifts the processing to step S103. If it is determined to be an instruction to edit favorites list 521 (S102: favorites), portal software 52 shifts the processing to step S104.

In step S103, portal software 52 (to be specific, friends editing module 522) edits friends list 515 in accordance with the editing instruction. That is, portal software 52 registers (adds) a new friend in friends list 515 or deletes an existing friend from friends list 515. Once friends list 515 has been edited, portal software 52 ends the processing in FIG. 6.

In step S104, portal software 52 (to be specific, friends editing module 522) edits favorites list 521 in accordance with the editing instruction. That is, portal software 52 registers (adds) a new favorite in favorites list 521 or deletes an existing favorite from favorites list 521. Once favorites list 521 has been edited, portal software 52 ends the processing in FIG. 6.

1-2-2. Case of System Software 51

Figure 7:
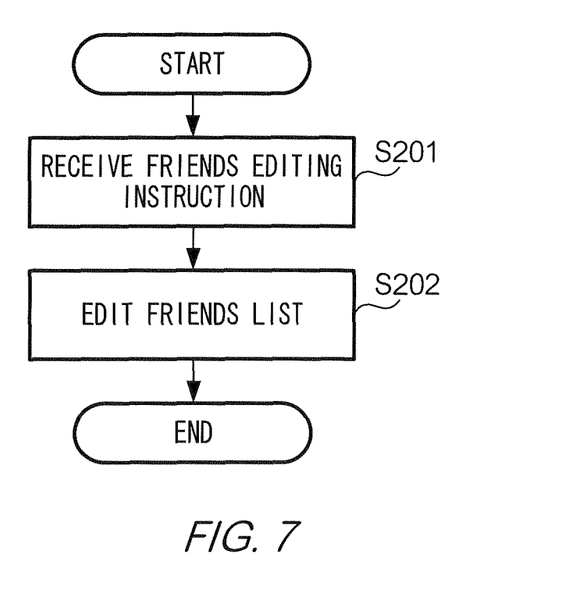
FIG. 7 shows an example of a flowchart illustrating a process for rewriting from system software 51.

FIG. 7 is a flowchart showing processing for rewriting from system software 51.

In step S201, system software 51 receives an instruction to edit friends list 515. This editing instruction is either to add a new friend or to delete an existing friend. This editing instruction is input via a friends list editing image that is displayed by selecting a predetermined button or icon from a menu image displayed immediately after information-processing device 10 is started up, for example. Alternatively, a button for processing a friend application is displayed on the profile image of the other user in the case where that user is not a friend, and a button for processing a friend cancellation is displayed on the profile image of the other user in the case where that user is a friend, and an editing instruction is input by pressing this button.

In step S202, system software 51 (to be specific, friends editing module 516) edits friends list 515. That is, system software 51 registers (adds) a new friend in friends list 515 or deletes an existing friend from friends list 515. Once friends list 515 has been edited, system software 51 ends the processing in FIG. 7.

According to this example, friends list 515 is shared by portal software 52 and system software 51. The user is able to perform rewriting such as registration of other users in friends list 515 from both portal software 52 and system software 51. Also, friends list 515 can be accessed from both portal software 52 and game application 53, and processing using friends can be performed.

2. Second Embodiment

In a second embodiment, portal software 52 and system software 51 each have a unique friends database. These two friends databases are synchronized at a predetermined timing. Hereinafter, description will be given focusing on the differences from the first embodiment.

Figure 8:
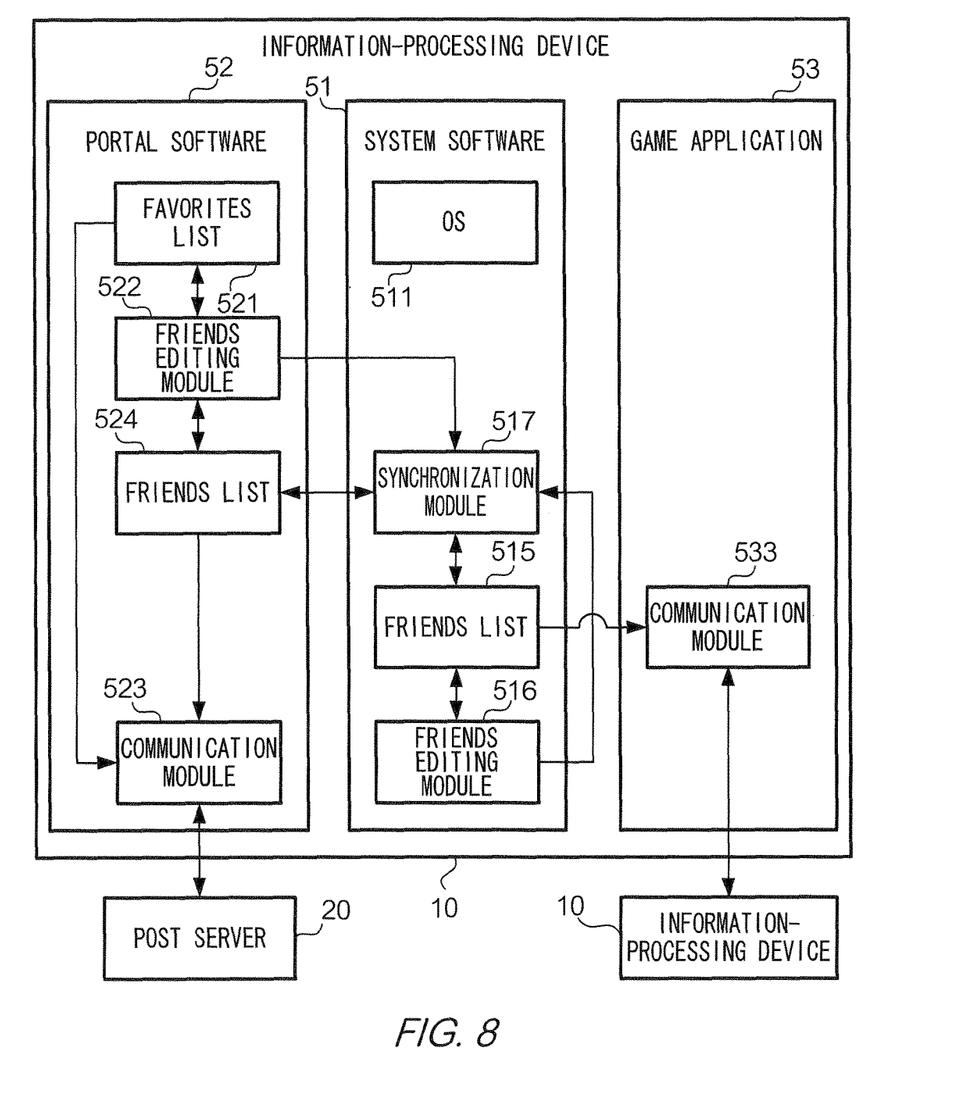
FIG. 8 shows an example of a software configuration of information-processing device 10 according to a second embodiment.

FIG. 8 shows a software configuration of information-processing device 10 according to the second embodiment. On comparison with the software configuration of FIG. 3, system software 51 differs in having synchronization module 517, and portal software 52 differs in having friends list 524. Synchronization module 517 synchronizes friends list 515 and friends list 524. Friends list 524 is a friends list unique to portal software 52. In the present embodiment, communication module 523 communicates with other users registered in friends or favorites, with reference to friends list 524 and favorites list 521. Also, friends editing module 522 edits favorites list 521 and friends list 524. Synchronization module 517 is an example of a synchronization unit that synchronizes friends list 515 and friends list 524.

Figure 9:
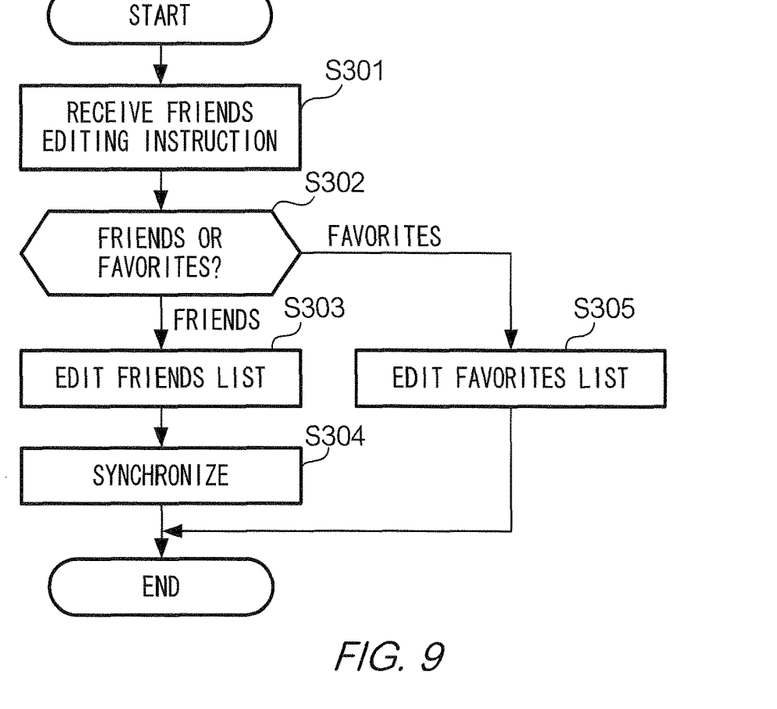
FIG. 9 shows an example of a flowchart illustrating a process for rewriting from portal software 52.

FIG. 9 is a flowchart showing processing for rewriting from portal software 52. In step S301, portal software 52 receives an instruction to edit friends. In step S302, portal software 52 determines whether the editing instruction is an instruction to edit friends list 524 or an instruction to edit favorites list 521. If it is determined to be an instruction to edit friends list 524 (S302: friends), portal software 52 shifts the processing to step S303. If it is determined to be an instruction to edit favorites list 521 (S302: favorites), portal software 52 shifts the processing to step S305.

In step S303, portal software 52 (to be specific, friends editing module 522) edits friends list 524 in accordance with the editing instruction. That is, portal software 52 registers (adds) a new friend in friends list 524 or deletes an existing friend from friends list 524. Furthermore, friends editing module 522 notifies synchronization module 517 that friends list 524 has been edited.

Once it has been notified that friends list 524 has been edited, system software 51 (to be specific, synchronization module 517) synchronizes friends list 524 and friends list 515 (step S304). Specifically, synchronization module 517 contrasts friends list 524 and friends list 515. If there is a portion that differs between both lists, synchronization module 517 edits friends list 515 so that both lists will be the same. That is, synchronization module 517 performs the same editing on friends list 515 as the editing performed at step S303. Once the lists have been synchronized, portal software 52 ends the processing in FIG. 9.

In step S305, portal software 52 (to be specific, friends editing module 522) edits favorites list 521 in accordance with the editing instruction. That is, portal software 52 registers (adds) a new favorite in favorites list 521 or deletes an existing favorite from favorites list 521. Once favorites list 521 has been edited, portal software 52 ends the processing in FIG. 9.

Figure 10:
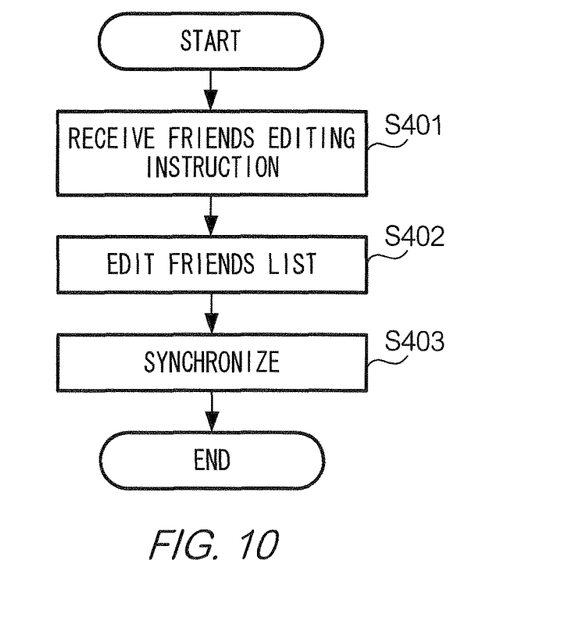
FIG. 10 shows an example of a flowchart illustrating a process for rewriting from system software 51.

FIG. 10 is a flowchart showing processing for rewriting from system software 51.

In step S401, system software 51 receives an instruction to edit friends list 515. In step S402, system software 51 (to be specific, friends editing module 516) edits friends list 515. That is, system software 51 adds a new friend to friends list 515 or deletes an existing friend from friends list 515. Furthermore, system software 51 notifies synchronization module 517 that friends list 515 has been edited.

Once notification that friends list 515 has been edited is received, system software 51 (to be specific, synchronization module 517) synchronizes friends list 524 and friends list 515 (step S403). Specifically, synchronization module 517 contrasts friends list 524 and friends list 515. If there is a portion that differs between both lists, synchronization module 517 edits friends list 524 so that both lists will be the same. That is, synchronization module 517 performs the same editing on friends list 524 as the editing performed at step S402. Once the lists have been synchronized, system software 51 ends the processing in FIG. 10.

3. Modifications

The technology herein is not limited to the abovementioned embodiments, and various modifications can be implemented. Hereinafter, a number of modifications will be described. Two or more of the following modifications may also be used in combination.

The associations used in the information sharing service and games are not limited to the friends and favorites described in the embodiments. For example, only friends may be used in the information sharing service, similarly to games. Also, friends and favorites may be used in games. Alternatively, associations whose conditions differ from the friends and favorites described in the embodiments may be used in at least one of the information sharing service and games.

Second application 15 is not limited to being implemented by game application 53. Second application 15 may be implemented by an application program for realizing a function other than a game, such as text editing application, a learning application, other practical software, or an information sharing service client application.

The software configuration of information-processing device 10 is not limited to that described in the embodiments. For example, in the exemplary software configurations described in the first and second embodiments, friends list 515 was included in system software 51. However, friends list 515 may be included in different software from system software 51. Also, synchronization module 517 may be included in different software from system software 51. Also, in the embodiments, an example was described in which system software 51 has friends editing module 516 (function of editing friends list). However, game application 53 may have a function of editing a friends list.

The hardware configuration of information-processing device 10 is not limited to that described in FIG. 2. A device having any hardware configuration that is able to realize the functions illustrated in FIG. 1 may be used.

The device configuration of information-processing system 1 is not limited to that described in the embodiments. At least a portion of the device configuration described as functions of information-processing device 10 in the embodiments may be realized by a server. In this case, the constituent elements of the information-processing system are realized by the processing of the processor of a terminal device, the processing of the processor of a server, or cooperative processing between the processor of a terminal device and the processor of a server. The division of processing can be designed as appropriate through the general technical knowledge of those skilled in the art. Also, posting server device 20 may be used as the server of this information-processing system, or a different device may be used.

Application programs that are executed by information-processing device 10 are not limited to those provided by storage media. Application programs may be provided by download via a network such as the Internet. Also, the system software of information-processing device 10 may be provided by storage media or download.

What is claimed is:

1. An information-processing system, comprising:
   a storage device configured to store identification information of one or more users of other information processing devices; and
   a processing system having at least one processor, the processing system configured to:
      execute at least one of a plurality of programs including client software, that includes portal software, for accessing an information sharing service and system software for controlling the information-processing system,
      wherein the storage device is configured to store at least a friends list,
   at least the client software and the system software are configured to independently register identification information of a first user in the friends list,
   wherein the friends list is modifiable by both the client software and the system software,
   wherein the plurality of programs includes an application program that differs from the client software and the system software, and
   the processing system is further configured to, when executing the application program, use identification information of users stored in the storage device to execute communication processing related to the application program for establishing communication with the users of the other information processing devices registered in the friends list.

2. The information-processing system according to claim 1, wherein
   the processing system is further configured to, when executing the client software, show posting information and information of another user who posted the posting information, and receive an instruction input from a user for registering identification information of the other user in the storage device, and
   register the identification information of the other user in the storage device, according to the instruction input.

3. The information-processing system according to claim 1, wherein
   the application program is a program for receiving data from a user of a computer and a user of another computer, and performing processing according to the received data.

4. The information-processing system according to claim 3, wherein
   the application program is a game program.

5. The information-processing system according to claim 1, wherein
   the processing system is further configured to register identification information of another user.

6. The information-processing system according to claim 1, wherein
   the storage device is further configured to store a first list including the identification information of the other users that is used by the client software, and a second list including the identification information of the other users that is used by the system software,
   the processing system is further configured to register, in the first list, identification information of another user, and
   register, in the second list, identification information of another user.

7. The information-processing system according to claim 6, wherein the processing system is further configured to synchronize the first list and the second list.

8. The information-processing system according to claim 1, wherein
   the storage device is further configured to store a first list including identification information of other users, and a second list including identification information of other users that differs from the first list,
   the processing system is further configured to select one of the first list and the second list, and register identification information of another user, and
   register, in the first list, identification information of another user.

9. The information-processing system according to claim 8, wherein
   the first list is registered based on mutual consent between a user of a computer and another user, and
   the second list is registered irrespective of consent of another user.

10. An information-processing device comprising a storage device and a processing system having at least one processor, the information-processing device configured to:
    execute one of a plurality of programs including client software, that includes portal software, for accessing an information sharing service and system software for controlling the information-processing device,
    wherein the storage device is configured to store at least a friends list,
    at least the client software and the system software are configured to independently register identification information of a first user in the friends list,
    wherein the friends list is modifiable by both the client software and the system software, wherein the plurality of programs includes an application program that differs from the client software and the system software, and the processing system is configured to, when executing the application program, use identification information of users stored in the storage device to execute communication processing related to the application program for establishing communication with the users of the other information processing devices registered in the friends list.

11. An information-processing method implemented using an information processing device having a processing system, the information-processing method comprising:

storing, in a storage device, identification information of one or more users of other information processing devices;

executing one of a plurality of programs including client software, that includes portal software, for accessing an information sharing service and system software for controlling the information-processing device, wherein the storage device is configured to store at least a friends list, at least the client software and the system software are configured to independently register identification information of a first user in the friends list, wherein the friends list is modifiable by both the client software and the system software, wherein the plurality of programs includes an application program that differs from the client software and the system software, and the processing system is configured to, when executing the application program, use identification information of users stored in the storage device to execute communication processing related to the application program for establishing communication with the users of the other information processing devices registered in the friends list.

12. A non-transitory computer-readable storage medium comprising a program causing a computer device to:

store, in a storage device, identification information of one or more users of other information processing devices;

execute, using a processing system, one of a plurality of programs including client software, that includes portal software, for accessing an information sharing service and system software for controlling the computer device, wherein the storage device is configured to store at least a friends list, at least the client software and the system software are configured to independently register identification information of a first user in the friends list, wherein the friends list is modifiable by both the client software and the system software, wherein the plurality of programs includes an application program that differs from the client software and the system software, and the processing system is configured to, when executing the application program, use identification information of users stored in the storage device to execute communication processing related to the application program for establishing communication with the users of the other information processing devices registered in the friends list.

13. The information-processing system according to claim 1, wherein the information is registered in a list stored in the storage device and commonly accessible by the plurality of programs being executed.

14. The information-processing system according to claim 13, wherein the storage device of the information-processing system stores at least the client software and the system software, and the client software and the system software are configured to access the list stored in the storage device and register information of users.

15. An information-processing system, comprising:

a storage device configured to store at least a friends list and a favorites list, the storage device further configured to store a plurality of application programs; and a processing system having at least one processor, the processing system configured to:

execute at least system software for controlling the information-processing system and portal software, the portal software configured to access an information sharing service;

independently register identification information of a first user in the friends list through execution of at least the portal software and the system software; and register identification information of a second user in the favorites list through execution of the portal software, wherein the friends list is modifiable by both the portal software and the system software, whereas the favorites list is only modifiable by the portal software, the plurality of application programs includes an application program that differs from the portal software and the system software, and the processing system is further configured to, when executing the application program, use identification information of users stored in the storage device to execute communication processing related to the application program for establishing communication with the users of other information processing systems registered in the friends list.

16. The information-processing system of claim 15, wherein the portal software and system software access the friends list during execution, and the portal software accesses the favorites list during execution.

17. The information-processing system according to claim 1, wherein the storage device is further configured to store a favorites list, and the client software is configured to register identification information of a second user in the favorites list.

18. The information-processing system according to claim 17, wherein the favorites list is modifiable by the client software.

19. The information-processing system according to claim 1, wherein the portal software includes an interface that presents information to users and receives input of information from users.

* * * * *